(12) United States Patent
Aoki

(10) Patent No.: US 7,301,889 B2
(45) Date of Patent: Nov. 27, 2007

(54) OPTICAL DISC

(75) Inventor: Ikuo Aoki, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 09/911,850

(22) Filed: Jul. 25, 2001

(65) Prior Publication Data

US 2002/0021647 A1 Feb. 21, 2002

(30) Foreign Application Priority Data

Jul. 25, 2000 (JP) .............................. 2000-224490

(51) Int. Cl.
*G11B 7/00* (2006.01)

(52) U.S. Cl. ............... 369/275.3; 369/47.22; 369/59.25

(58) Field of Classification Search ............ 369/275.3, 369/59.25, 44.13, 47.22, 275.1, 47.12, 47.13; 386/46, 125–126

See application file for complete search history.

(56) References Cited

U.S. PATENT DOCUMENTS

| | | | | |
|---|---|---|---|---|
| 4,229,808 A | * | 10/1980 | Hui | 369/53.14 |
| 5,138,599 A | * | 8/1992 | Fukushima et al. | 369/275.3 |
| 6,028,828 A | * | 2/2000 | Maeda | 369/44.13 |
| 6,167,022 A | * | 12/2000 | Ishida et al. | 369/44.13 |
| 6,201,784 B1 | * | 3/2001 | Maeda | 369/59.25 |
| 6,385,144 B1 | * | 5/2002 | Kuriuzawa et al. | 369/30.12 |
| 6,469,978 B1 | * | 10/2002 | Ohata et al. | 369/275.3 |
| 6,603,729 B1 | * | 8/2003 | Van Den Enden | 369/275.3 |
| 6,751,173 B1 | * | 6/2004 | Maeda | 369/275.1 |

FOREIGN PATENT DOCUMENTS

| | | | |
|---|---|---|---|
| JP | 10134357 A | * | 5/1998 |
| JP | 2000113465 A | * | 4/2000 |
| JP | 2000195060 A | * | 7/2000 |

* cited by examiner

*Primary Examiner*—William Korzuch
*Assistant Examiner*—Jorge L. Ortiz-Criado
(74) *Attorney, Agent, or Firm*—Stein, McEwen & Bui, LLP

(57) ABSTRACT

An optical disc having track grooves formed in a radial direction of the disc, and with the disc being divided into a plurality of zones, wherein track grooves are formatted into waved patterns, based on a predetermined modulation rule, in the radial direction of the disc to record zone address information for each of the divided zones. The waved pattern may overlap over recorded user data. Each zone has a recording capacity in which an arbitrary recording capacity is added to a data recording capacity needed for each divided zone.

9 Claims, 4 Drawing Sheets

A : DATA RECORDING AREA
B : COUPLING AREA
C : ZONE START AREA
D : ZONE END AREA

A : DATA RECORDING AREA
B : COUPLING AREA

A : DATA RECORDING AREA
B : COUPLING AREA
C : ZONE START AREA
D : ZONE END AREA

① : RECORDING AND REPRODUCTION GROOVE PORTION OF ZONE (n-m)
② : RECORDING AND REPRODUCTION LAND PORTION OF ZONE (n-m)
③ : RECORDING AND REPRODUCTION GROOVE PORTION OF ZONE (n-m+1)
④ : RECORDING AND REPRODUCTION LAND PORTION OF ZONE (n-m+1)
⑤ : RECORDING AND REPRODUCTION GROOVE PORTION OF ZONE (n-m+2)
⑥ : RECORDING AND REPRODUCTION LAND PORTION OF ZONE (n-m+2)

OPTICAL DISC

CROSS-REFERENCE TO RELATED APPLICATION

This application claims the benefit of Japanese Patent Application No. 2000-224490, filed on Jul. 25, 2000, in the Japanese Patent Office, the disclosure of which is incorporated herein by reference.

BACKGROUND OF THE INVENTION

1. Field of the Invention

The present invention is directed to an optical disc having pre-formatted zone addresses. More particularly, the present invention is directed to an optical disc where zone addresses formed thereon are formatted by making track grooves waved in a radial direction according to a predetermined modulation rule.

2. Description of the Related Art

In the arrangement of addresses in DVD-RAM discs, MO discs, CD-R discs, and CD-RW discs, for example, address information is typically pre-formatted at each minimum unit of data recording, e.g., at each sector. Also, a DVD-RAM disc has a structure of having spiral tracks for land and groove recording. However, in the above disc structures, files are managed according to the minimum units, or by each sector, and according to the arrangement of the corresponding addresses. Thus, the above method is effective for small amounts of data. However, when a large amount of data, e.g., a large image file, is to be managed, the above structure becomes a very ineffective system. Further, specifically in the DVD-RAM disc, manufacturing of a disc becomes difficult and results in increased cost, in response to land and groove recording.

SUMMARY OF THE INVENTION

It is an aspect of the present invention to provide an optical disc adopting disc format and data recording/reproducing methods suitable for managing large amount of data such as image and voice data in rewritable optical discs using a phase shift medium or MO medium, or a write once type optical disc using a pigment based medium.

Accordingly, to achieve the above and other objects, there is provided an optical disc, in which the optical disc is divided into a plurality of zones in a radial direction where track grooves are formatted to be waved in the radial direction of the disc, overlapping user data, to record zone address information for each of the divided zones based on a predetermined modulation rule. Each zone has a recording capacity in which an arbitrary recording capacity is added to a data recording capacity needed for each zone.

It is an additional aspect of the present invention to provide an arbitrary area at an inner and outer circumferences or either of an inner and outer circumferences in each zone of a disc, where the arbitrary area is configured to have a coupling area separate from a user data recording area of each zone.

It is a further aspect of the present invention to provide a coupling area, recorded with a predetermined pattern, in a zone of a disc.

It is a further aspect of the present invention to provide a disc, such that during recording of user data in each zone of the disc, a corresponding arbitrary zone start pattern or zone end pattern existing in a user data area is additionally recorded on the disc.

It is an aspect of the present invention to provide a disc, such that during recording of user data in each zone of the disc, a corresponding arbitrary zone start pattern or zone end pattern existing in user data area is additionally recorded on the disc.

These together with other aspects and advantages, which will be subsequently apparent, reside in the details of construction and operation as more fully described and claimed hereinafter.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE PREFERRED EMBODIMENTS

Figure 1A:
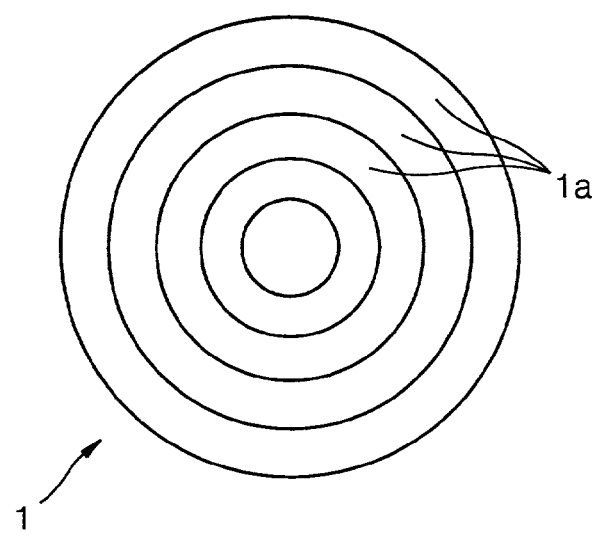
FIGS. 1A and 1B show the basic structure of an optical disc according to an embodiment of the present invention.

Reference will now be made in detail to preferred embodiments of the present invention, examples of which are illustrated in the accompanying drawings, wherein like reference numerals refer to the like elements throughout. The embodiments are described below in order to explain the present invention by referring to the figures.

The present invention relates to a data recording and reproducing technique in an optical disc in which address information is pre-formatted for a zone, rather than as conventionally performed in optical discs, such as CD-R/W discs, DVD-RAM discs, or MO discs, according to address information is pre-formatted at each of the minimum units of data, e.g., at each sector.

Figure 1B:
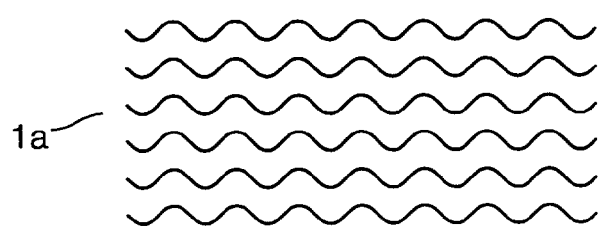

FIGS. 1A and 1B show the structure of a disc after application of an embodiment of the present invention. As shown in FIG. 1A, a disc 1 is divided into a plurality of zones 1a in a radial direction. Also, as shown in FIG. 1B, zone address information of each of the zones 1a is recorded by a wobble groove waved in the radial direction of the disc. Recording of the zone address information is achieved by making track grooves waved in a radial direction of the disc 1 according to a predetermined modulation rule. The waved grooves may also partially overlap user data recorded in a zone.

The above modulation rule may be an FM (frequency modulation) modulation, for use in CD-R discs for example, an AM (amplitude modulation) modulation, or a PM (phase modulation) modulation, for example.

In addition, as a zone dividing method, to secure data recording capacity needed by each zone, a coupling area having a predetermined capacity may be added to a data recording area, thus forming one zone.

The physical distinction between the data recording area and the coupling area is not essential. A certain number of tracks may be added to the data recording area as the coupling area. Actually, it is sufficient to secure several tracks as the coupling area. For example, assuming that a disc is divided into 60 zones, with the total number of tracks being 100,000, when 4 tracks are secured for each zone as the coupling area, only a total of 240 tracks (4 tracks×60 zones) would be secured as the coupling area.

Figure 2:
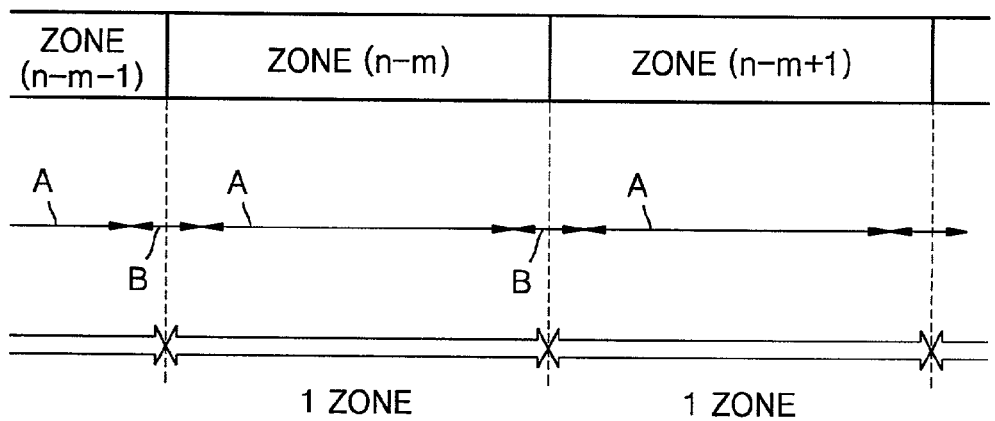
FIG. 2 shows a configuration of a coupling area according to a further embodiment of the present invention.

A method of recording data on an optical disc having the above structure is shown in FIG. 2. After an action of recording user data in a zone (n−m) is completed, a predetermined pattern is recorded in a section of the zone, e.g., coupling area B, until another zone address is detected in zone (n−m+1).

Figure 3:
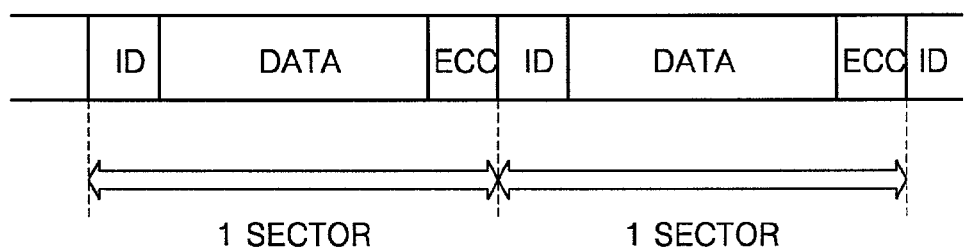
FIG. 3 shows a configuration of a data recording area according to another embodiment of the present invention.

When another zone address is detected in zone (n−m+1), the user data recording action starts with respect to the zone (n−m+1). Here, for each sector, user data may be recorded in a Data section, address information may be stored in an ID section, and corresponding ECC data may be stored in an ECC section, as illustrated in FIG. 3. Although it is enough that the size of a sector is 2 kB, it is preferable that the sector size should be 4 kB or more considering a large amount of data such as that representing an image.

Also, the aforementioned predetermined pattern recorded in a section of the recorded zone is not related to the user data and may be arbitrarily determined based on the system in use. Also, in an embodiment, it is assumed that files having a large amount of data, such as that representing an image, would be a major application object, with a corresponding minimum unit in the management of such files being a zone. When the size of data being managed is small as in the conventional technology, the aforementioned use of a minimum unit being a sector would be sufficient in the management of files. However, the use of a sector as the minimum unit would not be proper for a system when the size of one file is large.

As described above, by using these aforementioned embodiments of the present invention, although address information may not be pre-formatted at each sector, arrangement of data in each zone, using zone address information, is possible.

Further, since a physical distinction between the data recording area and the coupling area is not necessary when data is actually recorded, although a recording start position and a recording end position are located slightly different in front of or at the rear of the normal position, such an error is absorbed by the coupling area. Also, by the structure of recording an arbitrary pattern in the coupling area, overwrite to the disc can be continued without interruption.

Figure 4:
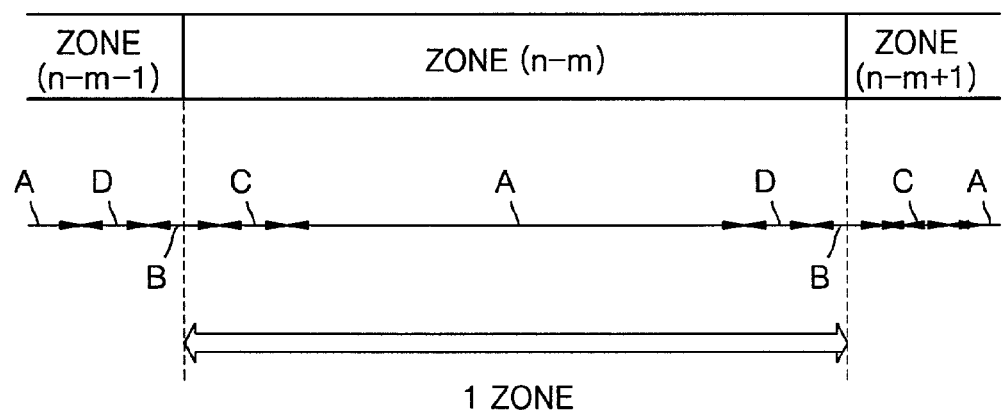
FIG. 4 shows a configuration of a zone start area and zone end area according to another embodiment of the present invention.

FIG. 4 shows a recording method according to a further embodiment of the present invention. In this embodiment, it is a characteristic feature of the disc that an area indicating a zone start and an area indicating a zone end are further provided in each zone further to the structure of the above embodiments of the present invention.

In detail, when the user data is recorded in zone (n−m), for example, arbitrary data for indicating a zone start position is first recorded in section C and then user data is recorded in section A. Thereafter, arbitrary data for indicating a zone end position is finally recorded in section D, before coupling area B, for example. By this structure, a data recording area and a coupling area can be clearly distinguished in each zone and data can be reproduced more simply and more accurately.

Figure 5:
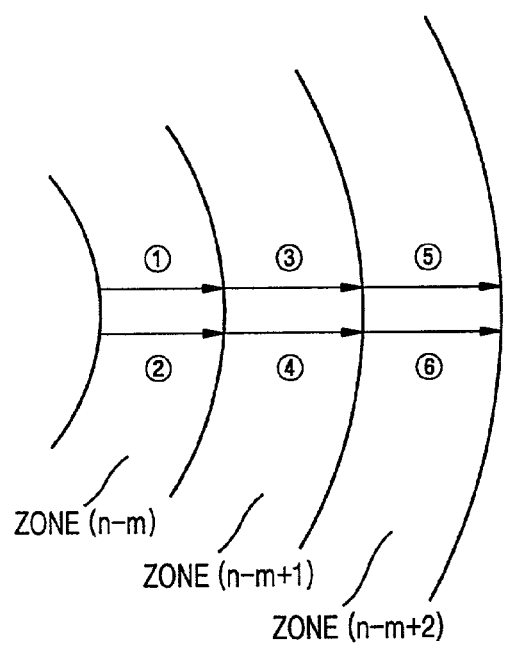
FIG. 5 shows a recording and reproduction sequence for a further embodiment of the present invention.

FIG. 5 shows a recording method according to a further embodiment of the present invention. Compared to the above described embodiments, this embodiment describes the sequence of recording and reproduction when land and groove recording is performed.

In the embodiment of FIG. 4, as the sequence of data recording and reproduction, after all recording and reproduction actions at a groove portion in each zone are completed, an optical head (not shown) is moved and a recording or reproduction action is performed at a land portion in the zone.

As illustrated in FIG. 5, the sequence of recording and reproduction, respectively, to and from the disc may be performed in the following sequence: (1) recording and reproduction of the groove portion of zone (n−m); (2) recording and reproduction of the land portion of zone (n−m); (3) recording and reproduction of the groove portion of zone (n−m+1); (4) recording and reproduction of the land portion of zone (n−m+1); (5) recording and reproduction of the groove portion of zone (n−m+2); and then (6) recording and reproduction of the land portion of zone (n−m+2), for example.

Thus, it is a characteristic feature of the present invention that land and groove recording and reproduction is possible, in a disc structure like a DVD-RAM disc, respectively, to and from more than one spiral. Furthermore, since the optical head is moved within one zone, which is very short distance, the present method is practical. Of course, it is possible to change the sequence of the groove portion and the land portion.

Further, by using the above embodiment illustrated in FIG. 5, when a disc is of a two spiral structure, a practical land and groove recording is possible.

Although the operations of the above embodiments of the present invention are described with reference to the drawings, the present invention is not limited to the above embodiments, and is also inclusive of modifications in design within the spirit and scope of the present invention.

As described above, in an optical disc in which zone address information of each zone is preformatted, since each zone is structured to have an arbitrary recording capacity added to the data recording capacity needed for each zone, data recording and reproduction can be accurately performed.

In addition, since a coupling area is provided in embodiments of the present invention, when the data recording position changes in each zone, the coupling area can compensate for any positional error.

Similarly, since an arbitrary pattern is recorded in the coupling area in embodiments of the present invention, when data is recorded over a plurality of zones, an overwrite action can be continuously performed without interruption.

Further, since embodiments of the present invention describe an arbitrary zone start pattern or a zone end pattern being added during user data recording, when implementing the present invention it is possible to accurately detect data start and end points in each zone.

Lastly, since recording or reproduction in the land portion, or groove portion, is performed after recording or reproduction in the groove portion, or land portion, it is possible to apply the embodiments of the present invention to land and groove recording.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An optical disc for use with a recording/reproducing apparatus in which track grooves are formatted into a waved pattern in a radial direction of the disc, the disc being divided into a plurality of zones comprising:
   a plurality of sectors each of which includes a data area having a designated recording capacity in which user data is recorded, and an identification area in which zone address information for each zone is recorded based on a predetermined modulation rule;
   at least one area to separate each zone from an adjacent zone and in which tracks are secured to be added to the data area of each of the zones; and
   a zone start pattern and a zone end pattern recorded at the beginning and the end of the user data, respectively, to define a position of the user data within the zone.

2. The optical disc of claim 1, wherein the optical disc is a DVD-RAM disc.

3. The optical disc of claim 1, wherein each of the plurality of sectors has a sector address portion to store a corresponding sector address.

4. The optical disc of claim 1, wherein each track further includes a land portion.

5. The optical disc of claim 1, further comprising data recorded in the area that is based on a recording or reproduction system that performs recording or reproduction, respectively, to or from the optical disc.

6. The optical disc of claim 1, wherein the predetermined modulation rule is one of an FM modulation, and AM modulation, and a PM modulation.

7. The optical disc of claim 1, wherein the number of the tracks for each zone is based upon the data recording capacity needed for each zone plus an arbitrary recording capacity.

8. The optical disc of claim 1, wherein each of the plurality of sectors has a sector address portion to store a corresponding sector address.

9. A method of recording data on an optical disc, comprising:
   dividing the optical disc into a plurality of zones;
   formatting a zone address portion of one of the zones to include a wobble pattern based on a predetermined modulation rule and corresponding to an address of the zone;
   recording user data and address information in the user data portion of the zone;
   securing tracks in an additional portion of the zone, after the recording of the user data, to be added to the user data portion of the zone;
   recording a zone start pattern in the user data portion of the zone to define a start of a user data portion of the zone; and
   recording a zone end pattern following an end of the recording of the user data to define an end of the user data portion of the zone

* * * * *

UNITED STATES PATENT AND TRADEMARK OFFICE
CERTIFICATE OF CORRECTION

PATENT NO.       : 7,301,889 B2
APPLICATION NO.  : 09/911850
DATED            : November 27, 2007
INVENTOR(S)      : Ikuo Aoki It is certified that error appears in the above-identified patent and that said Letters Patent is hereby corrected as shown below:

Column 5, line 5, insert --, each zone-- before "comprising".

Signed and Sealed this

First Day of April, 2008

JON W. DUDAS
*Director of the United States Patent and Trademark Office*